(12) United States Patent
Jacob et al.

(10) Patent No.: US 12,552,988 B2
(45) Date of Patent: Feb. 17, 2026

(54) MOISTURE RESISTANT CHEMILUMINESCENT MARKING SYSTEMS AND COMPOSITIONS

(71) Applicant: Cyalume Technologies, Inc., West Springfield, MA (US)

(72) Inventors: Linda Anne Jacob, Woodbridge, CT (US); Joseph Gelo, Denville, NJ (US); Stephen L. Palmer, Cameron Park, CA (US); William R. Palmer, Rescue, CA (US)

(73) Assignee: Cyalume Technologies, Inc., West Springfield, MA (US)

( * ) Notice: Subject to any disclaimer, the term of this patent is extended or adjusted under 35 U.S.C. 154(b) by 704 days.

(21) Appl. No.: 18/045,024

(22) Filed: Oct. 7, 2022

(65) Prior Publication Data
US 2023/0116430 A1   Apr. 13, 2023

Related U.S. Application Data (60) Provisional application No. 63/253,368, filed on Oct. 7, 2021.

(51) Int. Cl.
*C09K 11/07* (2006.01)

(52) U.S. Cl.
CPC ...... *C09K 11/07* (2013.01); *C09K 2211/1007* (2013.01)

(58) Field of Classification Search
CPC .................................................. C09K 11/07
See application file for complete search history.

(56) References Cited

U.S. PATENT DOCUMENTS

| | | | |
|---|---|---|---|
| 3,816,325 A | 6/1974 | McKay et al. | |
| 3,893,938 A * | 7/1975 | Rauhut | F21K 2/06 427/337 |
| 8,361,352 B2 | 1/2013 | Cranor et al. | |
| 8,584,550 B1 | 11/2013 | Cranor et al. | |
| 8,584,591 B2 | 11/2013 | Cranor et al. | |
| 9,074,857 B2 | 7/2015 | Cranor | |
| 2011/0085318 A1 | 4/2011 | Cranor et al. | |
| 2012/0097063 A1 | 4/2012 | Cranor et al. | |
| 2012/0097091 A1 * | 4/2012 | Cranor | F42B 12/40 116/202 |
| 2012/0175275 A1 | 7/2012 | Palmer et al. | |

* cited by examiner

*Primary Examiner* — Peter F Godenschwager
(74) *Attorney, Agent, or Firm* — McHale & Slavin, P.A.

(57) ABSTRACT

Chemiluminescent marking systems, and methods of making thereof. The chemiluminescent marking systems are configured to be moisture resistant and provide light over a broad range of temperature ranges. The chemiluminescent marking system may provide formulations or compositions which provide improvements over current chemiluminescent systems to one or more of the following attributes: 1) increased shelf-life, 2) easy use, 3) better performance in moist conditions, 4) performance over a broader range of temperatures, 5) the ability to reuse the same device over several days, and 6) more facile means of production.

18 Claims, 8 Drawing Sheets
(7 of 8 Drawing Sheet(s) Filed in Color)

10 →

| Time | 15 min. | 1 hour | 2 hour | 3 hour | 4 hour | 5 hour | 6 hour | 7 hour | 8 hour |
|---|---|---|---|---|---|---|---|---|---|
| LOP | 4.81 | 0.589 | 0.334 | 0.330 | 0.313 | 0.227 | 0.219 | 0.156 | 0.151 |

| Time | 15 min. | 1 hour | 2 hour | 3 hour | 4 hour | 5 hour |
|---|---|---|---|---|---|---|
| LOP | 4.45 | 2.65 | 1.56 | 0.864 | 0.522 | 0.376 |

MOISTURE RESISTANT CHEMILUMINESCENT MARKING SYSTEMS AND COMPOSITIONS

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 63/253,368, entitled "MOISTURE RESISTANT CHEMILUMINESCENT MARKING SYSTEMS AND COMPOSITIONS", filed Oct. 7, 2021. The contents of the above referenced application are incorporated herein by reference in their entirety.

FIELD OF THE INVENTION

Embodiments of the invention relate to chemiluminescent compounds; to chemiluminescent marking systems; and more particularly, to formulations and processes to make a moisture resistant, broad temperature range chemiluminescent marking system.

BACKGROUND OF THE INVENTION

Chemiluminescent systems are well known in the art. In general, such systems consist of an energy molecule, fluorescer, oxidizer, and catalyst, which, when combined, produce chemical light. Such systems have widespread applications, from novelty light sticks to military applications as ammunition for training or as marking systems. While chemiluminescent light producing systems have advantages over other light systems, i.e., can be stored in plastic cartridges or light generated without producing heat, the use of chemiluminescence in marking devices has been plagued with several persistent problems.

Effective chemiluminescent marking systems require long shelf-life, feasibility of manufacturing on a commercial scale, ease of use, performance (brightness and duration of usable light), water resistance, and suitability to a wide range of temperatures, Many of the problems associated with chemiluminescent marking result from the moisture and temperature sensitivity of the oxalates used, most notably bis{3,4,6-trichloro-2-[(3-methylbutoxy)carbonyl]phenyl} oxalate CIPO and/or bis{3,4,6-trichloro-2-[(pentyloxy)carbonyl]phenyl} oxalate (CPPO). CPPO, the most commonly used oxalate, is moisture and temperature sensitive. Chemiluminescent systems using CPPO are difficult to encapsulate, spray dry, or prill. The temperatures required for prilling result in degradation of the CPPO. Previous methods to encapsulate CPPO or a solution containing CPPO have used coacervation with several techniques. Most of these methods, however, require an aqueous solution at some stage of the process. Since it is very difficult to reduce the retained moisture to an acceptable level, the disadvantage of these processes is that CPPO will degrade. Once the degradation process begins it does not stop, thus shortening the shelf-life and harming the performance of the final product. As a result, although attempts have been made to commercialize CPPO based marking devices, they are not viable. Accordingly, what is needed in the art are moisture resistant, broad temperature chemiluminescent marking systems which overcome the shortcomings associated with current chemiluminescent marking systems.

SUMMARY OF THE INVENTION

Embodiments of the invention provide formulations and processes to make a moisture resistant, broad temperature chemiluminescent marking system. The improved chemiluminescent marking systems are designed to have one or more of the following attributes over current systems: increased shelf-life, easy use, better performance in moist conditions, performance over a broader temperature range, the ability to reuse the same device over several days, and more facile means of production. The improved chemiluminescent marking systems may take the form of a gel or wax and may have widespread applications within more varied environments, such as but not limited to marking of interior or exterior walls, metal rails, polymer surfaces, and wooden constructs that may be subject to a variety of temperature and moisture conditions.

The chemiluminescent marking systems comprise a first chemiluminescent reactant component including a chemiluminescent reactant mixture, and second chemiluminescent reactant component including a chemiluminescent reactant mixture, wherein contact between the first chemiluminescent reactant component and the second chemiluminescent reactant component generates chemiluminescent light.

Accordingly, it is an objective of the instant invention to provide an improved chemiluminescent marking system.

It is a further objective of the invention to provide a moisture resistant chemiluminescent marking system.

It is yet another objective of the invention to provide a chemiluminescent marking system having enhanced thermal stability which allows performance over a broader temperature range.

It is a still further objective of the invention to provide improved chemiluminescent marking systems which are resistant to degradation.

It is a still further objective of the invention to provide improved chemiluminescent marking systems having increased shelf-life.

It is a further objective of the invention to provide a moisture resistance, chemiluminescent marking system in the form of a gel, and having functionality, i.e. stronger and/or longer light output, in a wider range of temperatures.

It is yet another objective of the invention to provide a moisture resistance, chemiluminescent marking system in the form of a wax, and having functionality, i.e. stronger and/or longer light output, in a wider range of temperatures.

It is a still further objective of the invention to provide an improved chemiluminescent marking system in encapsulated form.

It is a further objective of the invention to provide an improved chemiluminescent marking system which exhibits the ability to perform in chemiluminescent reactions after prilling.

It is yet another objective of the invention to provide improved chemiluminescent marking systems that are easy to use.

It is a still further objective of the invention to provide improved chemiluminescent marking systems that perform in moist conditions.

It is a further objective of the invention to provide improved chemiluminescent marking systems that perform over a broader range of temperatures.

It is yet another objective of the invention to provide improved chemiluminescent marking systems that can be configured to allow reuse of the same device over several days.

It is a still further objective of the invention to provide improved chemiluminescent marking systems designed to provide more facile means of production.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3A is a picture of the light output of a wax marking system described in Example 4, spread onto a piece of steel plate that was conditioned in the freezer (−16° C.) overnight; shown at initial start time, with lights on;

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Embodiments of the invention, as described herein, are directed towards chemiluminescent marking systems, and methods of making thereof. The chemiluminescent marking systems are designed to be moisture resistant and provide light over a broader temperature range. Accordingly, embodiments of the moisture resistant, broad temperature chemiluminescent marking systems may be used in a wide variety of environments. The chemiluminescent marking systems may provide formulations or compositions which provide improvements over current chemiluminescent systems to one ox more of the following attributes: 1) increased shelf-life, 2) easy use, 3) better performance in moist conditions, 4) performance over a broader range of temperatures, 5) the ability to reuse the same device over several days, and 6) more facile means of production. The chemiluminescent marking system formulations may be compounded directly 0 in encapsulated form. Similar to other chemiluminescent systems, the moisture resistant, broad temperature chemiluminescent marking system first part may comprise at least one oxalate ester, at least one fluorescer, and may have at least one inorganic salt in an organic carrier solvent, referred to generally as an oxalate composition. The moisture resistant, broad temperature chemiluminescent marking system may comprise a second part, an activator composition which may comprise at least one peroxide and at least one catalyst in an organic carrier solvent. The individual components of the moisture resistant, broad temperature chemiluminescent marking system may be compounded directly, in a prilled form, or in encapsulated form into marking systems.

In an illustrative embodiment, the moisture resistant, broad temperature chemiluminescent marking system may be a gel(s). In another illustrative embodiment, the moisture resistant, broad temperature chemiluminescent marking system may be a wax(es). The gels or waxes in accordance with embodiments of the moisture resistant, broad temperature chemiluminescent marking systems can be formulated to be deliverable by various mechanisms, which may include using a wide variety of commercially available containers ranging from dual syringes, dual compartment squeeze containers, dual chamber pressurized systems (aerosol or bag-on-valve systems), and a variety of push-up or screw mechanism advanced containers. The delivery mechanism or vehicle associated with delivering the moisture resistant, broad temperature chemiluminescent marking system gels or waxes may depend upon the rheology and desired use.

Gel Marker: A chemiluminescent gel suitable for use as a marker may be made through the combination of a mixture of ingredients and a suitable oxalate as an energy component, hereafter referred to as the gel oxalate mixture, and a peroxygen containing component with a catalyst, hereafter referred to as the gel activator mixture. The gel oxalate mixture may be comprised of a suitable solvent or solvent mixture, a dye or dye mixture capable of chemiluminescence, a form of bis{3,4,6-trichloro-2-[(phenylmethoxy)carbonyl]phenyl} oxalate (CBzPO) and/or bis{3,4,6-trichloro-2-[(cyclohexylmethoxy)carbonyl]phenyl} oxalate (CyHMPO), referred to as the oxalate ester, one or more rheology adjusting reagents, and a salt that generates heat in combination with a peroxygen if the application warrants use across a broader temperature range. The gel activator mixture is comprised of a suitable solvent or solvent mixture, a peroxygen in one or more forms, one or more suitable catalysts, and one or more rheology adjusting reagents.

Illustrative examples of solvents used for the gel oxalate mixture may include, but are not limited to, benzoate esters, dialkyl glycol ethers, glycol diesters, dialkyl polyglycol ethers, polyglycol diesters, dialkyl malonates, dialkyl 2-alkylmalonates, dialkyl 2,2-dialkylmalonates, dialkyl adipates, glyceryl triesters, acetyl trialkyl citrates, phthalate esters, terephthalate esters, and a variety of alkane-based solvents including ISOPARS® A single solvent or a combination of solvents in varying ratios may be optimum. When two solvents are used, depending upon the solvents chosen and their solubility with each other, the ratios may vary, including, but not limited to, a range between 95% and 5% to 50% and 50% for two solvents. The preferred range being from 80% and 20% to 60% and 40% for two solvents. For three solvents, embodiments of the chemiluminescent marking system gel may include a range of ratios of 5:5:90 to a ratio of 60% of one solvent and a mixture equaling the remaining 40% comprised of two other solvents being preferred. The scope of ratio(s) may be modified and depends upon the choice of dye, oxalate ester, and rheology adjusting reagents. The total amount of solvent used may be from 90% to 50% of the total mass of the gel oxalate mixture, with the preferred amount being from 85% to 60%. The total mass of the gel oxalate mixture used may depend upon the desired application.

Illustrative examples of chemiluminescent dyes for use with the gel oxalate mixture may include, but are not limited to, 9,10-bisphenylanthracene and halogenated derivatives of this compound, 9,10-bis(phenylethynyl)anthracene and alkylated, nitrated, halogenated, alkoxy, and arylated derivatives of this dye, 9-phenyl-10-(phenylethynyl)anthracene and alkylated, nitrated, halogenated, alkoxy, and arylated derivatives of this dye, perylene dyes, rubrene and alkylated, halogenated, and phenylated derivatives of this dye, acridones, and 15,16-dialkyloxyviolathrone and derivatives or isomers of this dye. The preferred total concentration of dye(s) being between, but not limited to, 0.2% and 1%.

Illustrative examples of the forms of CBzPO and/or CyHMPO may include, but are not limited to, the neat, purified compound(s), prilled particles, spray dried particles, polymer coated prilled particles, and polymer coated spray dried particles. The forms of CBzPO and/or CyHMPO may be dispersed into the formulation while it is hot, warm, or cool depending upon the form used or final product needed. The preferred concentration of oxalate ester being between, but not limited to, 5% to 35%. The concentration of oxalate ester may depend upon the solvent mixture and application parameters.

Illustrative examples of rheology adjusting reagents for the gel oxalate mixture may include, but are not limited to, one or more GEON® resins, one or more fumed silicas, one or more of low-melting fatty acid esters, one or more of glyceryl triesters, polyethylene waxes, and one or more of paraffins. The total concentration of rheology adjusting reagents may be, but are not limited to, between 5% to 40%, with a preferred concentration being between, but not limited to, 7% to 25. The total concentration of rheology adjusting reagents used may depend upon the desired application.

Illustrative examples of solvents for the gel activator mixture may include, but are not limited to, dialkyl phthalates, tertiary alcohols, trialkyl citrates, and dialkyl 2,2-dialkylmalonates.

Illustrative examples of peroxygens for the gel activator mixture may include, but are not limited to, hydrogen peroxide, urea peroxide, percarbonate salts, hydrogen percarbonate salts, alkaline peroxides, and alkaline earth peroxides in their regular or encapsulated forms.

Illustrative examples of catalysts for the gel activator may include, but are not limited to, salicylate salts, halogenated salicylate salts, benzoate salts, alkylated or halogenated benzoate salts, tertiary alkyl amines, carbonate, and hydrogen carbonate salts.

Illustrative examples of rheology adjusting reagents for use with the gel activator mixture may include, but are not limited to, one or more of GEON® resins, one or more of fumed silicas, one or more of low-melting fatty acid esters, one or more glyceryl triesters, polyethylene waxes, and one or more paraffins. The total concentration of rheology adjusting reagents may be, but is not limited to, between, 5% to 30%, with the preferred concentration being between, but not limited to, 7% to 25%. The total concentration of rheology adjusting reagents may depend upon the desired application.

In use, the oxalate and activator gels are placed into a dual chamber device where the two gels are separated by a barrier, such as polyethylene, polypropylene, or special plasticized foil barrier. The dual chamber device may be commercially available dual chamber syringes, foil divided squeeze tubes, or dual chamber caulking devices. The device may contain a static mixer if deemed necessary based upon the viscosity and ease of mixing of the two components.

Wax Marker: A chemiluminescent wax suitable for use as a marker may be made through the combination of an energy component, hereafter referred to as a wax oxalate mixture, and a peroxygen containing component with a catalyst, hereafter referred to as a wax activator mixture. The wax oxalate mixture may comprise of a suitable solvent or solvent mixture, a dye or dye mixture capable of chemiluminescence, a form of CBzPO and/or CyHMBPO, and one or more rheology adjusting reagents. The wax activator mixture may comprise of a suitable solvent or solvent mixture, a peroxygen in one or more forms, one or more suitable catalysts, one or more rheology adjusting reagents, and a salt that generates heat in combination with a peroxygen if the application warrants use across a broader temperature range.

Illustrative examples of solvents which may be used for the wax oxalate mixture may be, but are not limited to, benzoate esters, dialkyl glycol ethers, glycol diesters, dialkyl polyglycol ethers, polyglycol diesters, dialkyl malonates, dialkyl 2-alkylmalonates, dialkyl 2,2-dialkylmalonates, dialkyl adipates, glyceryl triesters, acetyl trialkyl citrates, phthalate esters, terephthalate esters, and one or more alkane-based solvents including ISOPARS®, A single solvent or a combination of solvents in varying ratios may be optimum. When two solvents are used, depending upon the solvents chosen and their solubility with each other, the ratios may vary, and may include, but are not limited to a range between 95% and 5% to 50% and 50% for two solvents. The preferred range being from 80% and 20% to 60% and 40%. For three solvents, a range of ratios of 5:5:90 to a ratio of 60% of one solvent and a mixture equaling the remaining 40% comprised of two other solvents being preferred. The scope of ratio(s) may depend upon the choice of dye, oxalate ester, and rheology adjusting reagents. The total amount of solvent used may be from 90% to 50% of the total mass of the wax oxalate mixture, with the preferred amount being from 85% to 60%. The total amount of solvent used may depend upon the application and other components used.

Illustrative examples of chemiluminescent dyes for the wax oxalate mixture may comprise, but are not limited to, 9,10-bisphenylanthracene and halogenated derivatives of this compound, 9,10-bis(phenylethynyl)anthracene and alkylated, nitrated, halogenated, alkoxy, and arylated derivatives of this dye, 9-phenyl-10-(phenylethynyl)anthracene and alkylated, nitrated, halogenated, alkoxy, and arylated derivatives of this dye, perylene dyes, rubrene and alkylated, halogenated, and phenylated derivatives of this dye, acridones, and 15,16-dialkyloxyviolathrone and derivatives or isomers of this dye. The preferred total concentration of dye(s) being between, but not limited to, 0.3% and 1%. The total concentration of dye(s) may be modified to include ranges outside the preferred ranges depending upon application and other components used.

Illustrative examples of the forms of CBzPO and/or CyHMPO may be, but are not limited to, the neat, purified compound(s), prilled particles, spray dried particles, polymer coated prilled particles, and polymer coated spray dried particles. The forms of CBzPO and/or CyHMPO may be dispersed into the formulation while it is hot, warm, or cool depending upon the form used or final product needed. The preferred concentration of oxalate ester being between, but not limited to, 5% to 35%. The concentration of oxalate ester used may depend upon the solvent mixture and application parameters.

Illustrative examples of rheology adjusting reagents for the wax oxalate mixture may comprise, but not be limited to, one or more GEON® resins, one or more fumed silicas, one or more low-melting fatty acid esters, one or more glyceryl triesters, one or more paraffins, and polyethylene waxes. The total concentration of rheology adjusting reagents may be between, but not limited to, 15% to 80%, with the preferred concentration being between 30% to 70%. The total concentration of rheology adjusting reagents used may depend upon the desired application.

Illustrative examples of salts that generate heat in combination with a peroxygen may include, but are not limited to, sodium thiosulfate, potassium thiosulfate, cobalt acetate, copper acetate, lead acetate, cupric chloride, ferric chloride, calcium iodide, potassium iodide, silver nitrate, and a combination thereof. The total concentration of salts being between, but not limited to, 0% to 7%, with the preferred concentration being between 2% to 5% depending upon the desired application.

The oxalate wax can be cast, prilled, or extruded into the pieces of the desired size. These particles may be coated in an inert material if desired. This may be done to facilitate packaging, prolong shelf life, or provide some protection over a greater range of temperatures.

EXAMPLES

Unless otherwise indicated, all numbers expressing quantities of ingredients, reaction conditions, and so forth, used in the specification and claims are to be understood as being modified by the term "about". Accordingly, unless indicated to the contrary, the numerical parameters set forth in the following specification and attached claims are approximations that may vary depending upon the desired properties sought to be obtained by the present disclosure.

As used herein, use of "about" includes a value or amount which is up to 20% higher or lower than the stated numerical value, concentration, or amount.

As used herein, the light emitted by the marking system was measured using light meter with a probe chosen dependent upon the light being emitted (infrared, visible, etc.). For example, for light emission in the visible spectrum, an irradiance probe was used. One of ordinary skill in the art would be aware of how to select a probe suitable for measuring the wavelength of light the marking system has been designed to emit. All temperatures were reported in Celsius. All percentages were by weight.

General procedure for making the oxalate mixture follows. The solvent(s) (non-solids and solids) were placed into a suitable vessel purged with nitrogen to reduce moisture that has a means of heating and stirring. The contents were heated and stirred homogenous. Polyethylene, paraffin waxes, or other organic rheology modifiers were added. Heat was increased as needed to dissolve these materials. Any dyes were added and stirred until fully dissolved. Once done, the internal temperature was adjusted to be below 120° C. if necessary. The oxalate (CyHMPO or CBzPO) was added and stirred to dissolve. The heat was turned off and immediately sodium thiosulfates added. The fumed silica was added, and the speed of the stirrer was increased. Stirring was continued while the mixture cooled sufficiently to be poured into containers or molds.

General procedure for making the activator mixture follows. The (non-solids and solids) solvent(s) e placed into a suitable vessel purged with nitrogen to reduce moisture that has a means of heating and stirring. The contents were heated and stirred until homogenous. Any polyethylene, paraffin waxes, or other organic rheology modifiers were added. The heat was increased as needed to dissolve these materials. The desired catalyst was added and stirred until fully incorporated. The heat of the mixture was reduced to below 90° C. if heated above that temperature to incorporate materials. Peroxygen was added. The mixing speed was increased and fumed silicas were added, if applicable. The mixture was continuously stirred while the mixture cooled sufficiently to be poured into containers or molds.

The light output of various formulations was measured by the following method. The procedure involved the mixing of equal portions of oxalate and activator waxes in a beaker for 2-5 minutes with a flat bladed spatula until a consistent mixture was obtained. This mixture was then placed in an aluminum mold that allowed it to be placed onto a polypropylene mesh on cardstock. This gave a wax slab about ⅛" thick. Once the mold was removed, the wax containing cardstock could be fit into a holder that maintained a constant distance from the detector for all tests. All values are in lux.

Example 1: Gel Marking System

An illustrative embodiment of the gel marker comprises a gel oxalate mixture and a gel activator mixture. The gel oxalate mixture was made using solution of butyl benzoate containing 0.2% of 2-methyl-9,10-bis(phenylethynyl)anthracene (MBPEA). This was warmed to dissolve 5% of CBzPO. As the mixture cooled, 8% of a fumed silica was added, portion wise using a high shear mixer.

Once the mixture cooled sufficiently, it was placed into a container for dispensing or storage.

The gel activator mixture was made using triethyl citrate with 5% of 50% aqueous hydrogen peroxide without stabilizers. To this, 0.06% of sodium salicylate was added. Once added, the speed of the high shear mixer was increased, and 8% of a fumed silica was added, portion wise until the mixture was consistent. This was placed into a container for dispensing or storage.

Example 2: Wax Marking System

A two-part chemiluminescent system comprising a wax oxalate mixture comprised of 14.5% microcrystalline wax, 19.5% didodecyl succinate, 19.5% low density polyethylene wax, 29% butyl benzoate, 0.33% 2-methyl-9,10-bis(2-phenylethynyl)anthracene, 0.02% rubrene, 0.1% of a hydrophobic fumed silica, 12% CyHMPO, and 5% sodium thiosulfate and a wax activator system comprising of 32.5% glycerol tribenzoate, 39% triethyl citrate, 13.3% microcrystalline wax, 2.5% of a hydrophobic fumed silica, 2.5% of a hydrophilic fumed silica, 10% of 50% aqueous hydrogen peroxide, and 0.2% sodium salicylate was made.

Figure 1:
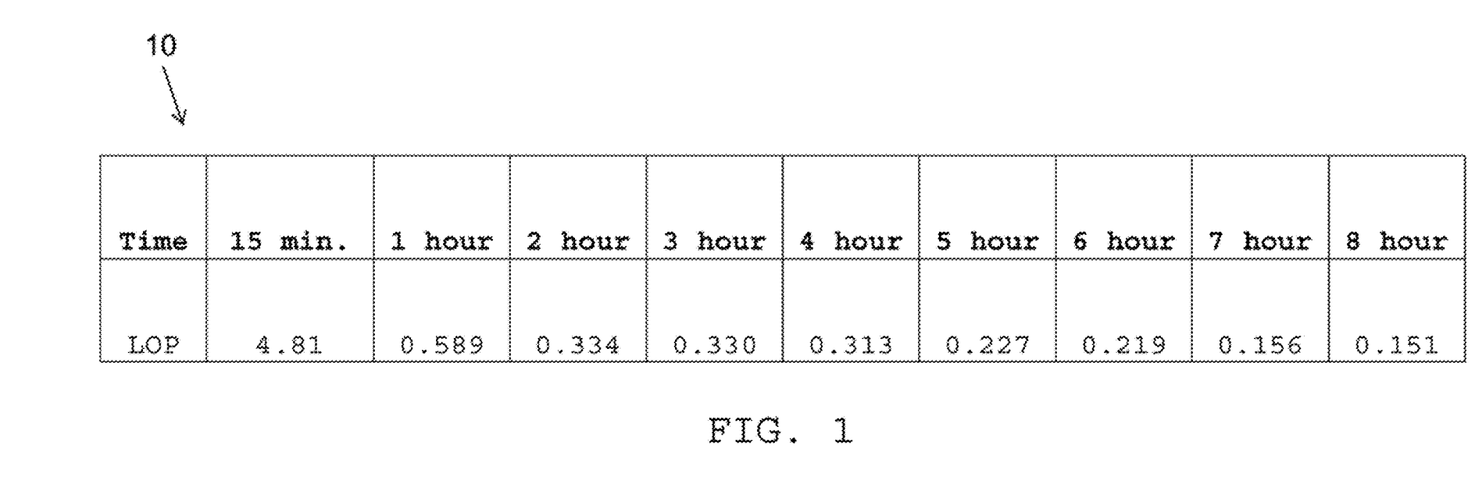
FIG. 1 is a data table of light output readings (LOP) associated with the embodiment described in Example 2, Wax Marking System.

The two-part chemiluminescent system was tested by thoroughly mixing 2 g of wax oxalate mixture and 2 g of wax activator mixture for a period of 5 minutes to obtain a consistent composition. This was placed onto the test card using the mold. The test card was placed into the holder used for light output readings (LOP). The data collected is shown in table 10, see FIG. 1. All values are in lux.

Example 3: Wax Marking System

A two-part chemiluminescent wax Marking system comprising a wax oxalate mixture comprised of 26% microcrystalline wax, 34.7% cetyl palmitate, 28.9% butyl benzoate, 0.4% 2-methyl-9,10-bis(2-phenylethynyl)anthracene, 0.02% rubrene, and 10% CBzPO and a wax activator system comprised of 33.3% glycerol tribenzoate, 39.1% triethyl citrate, 12.7% microcrystalline wax, 2.4% of a hydrophobic fumed silica, 2.4% of a hydrophilic fumed silica, 9.8% of 50% aqueous hydrogen peroxide, and 0.2% sodium salicylate was made.

Figure 2:
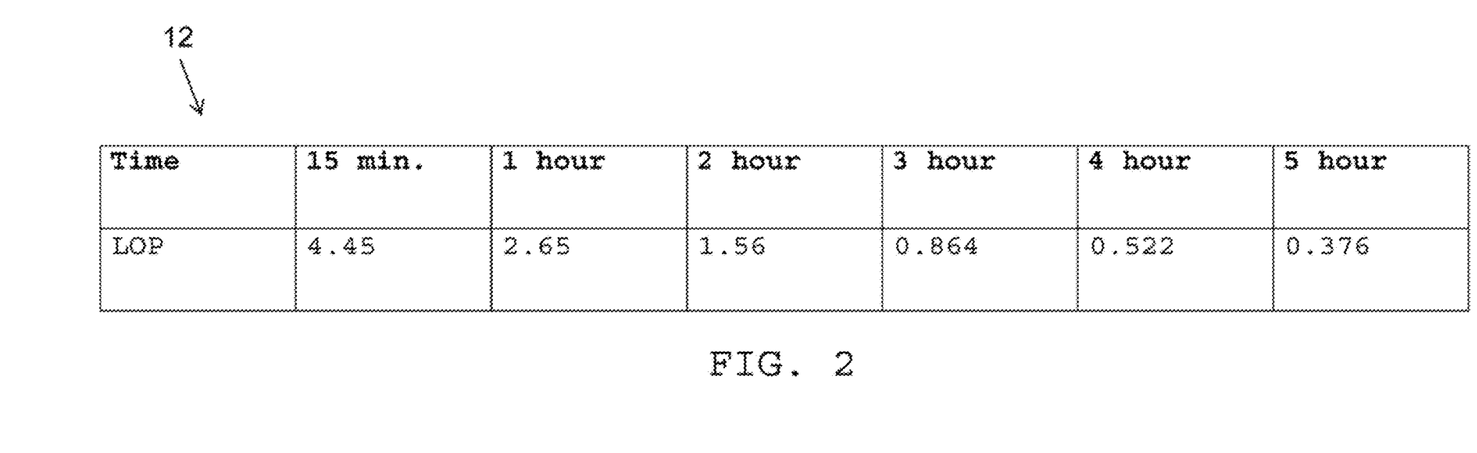
FIG. 2 is a data table of light output readings (LOP) associated with the embodiment described in Example 3, Wax Marking System.
Figure 3A:
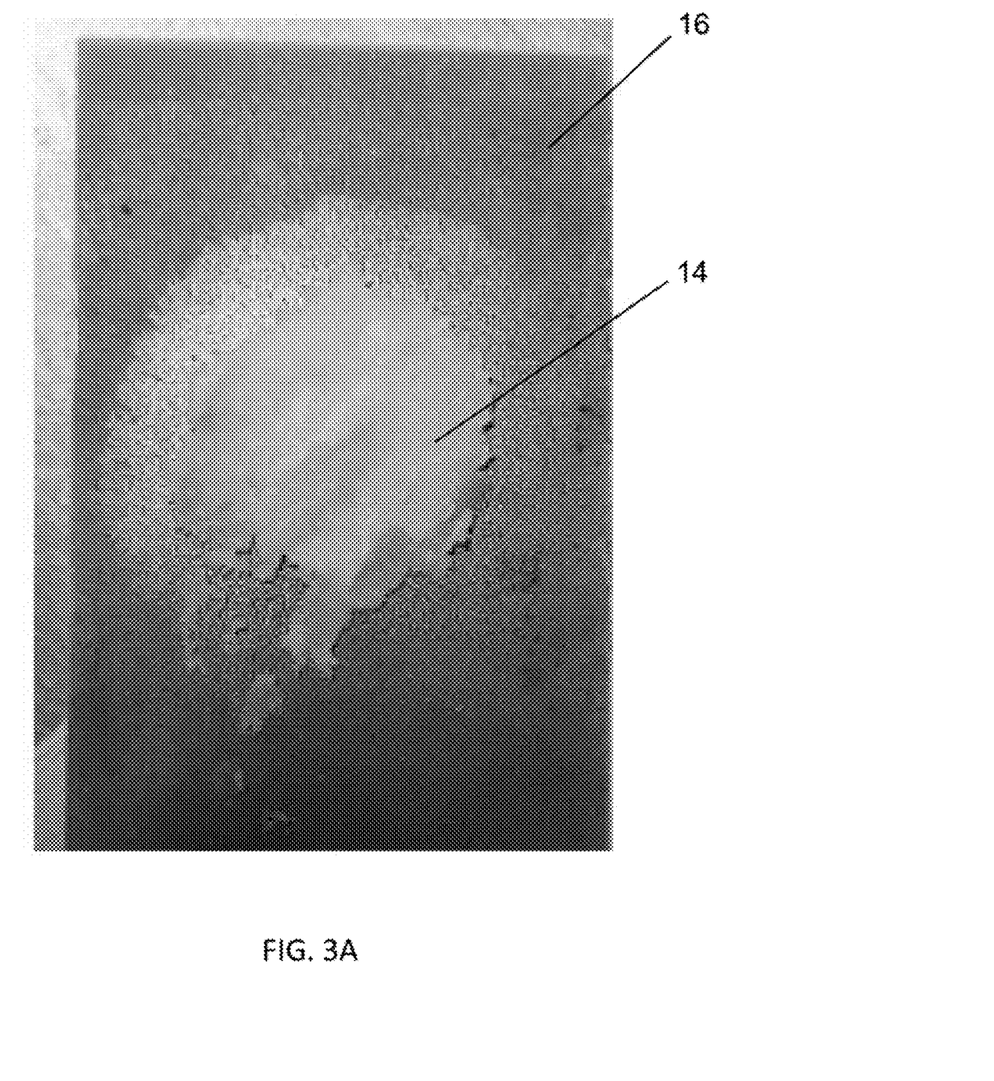
Figure 3B:
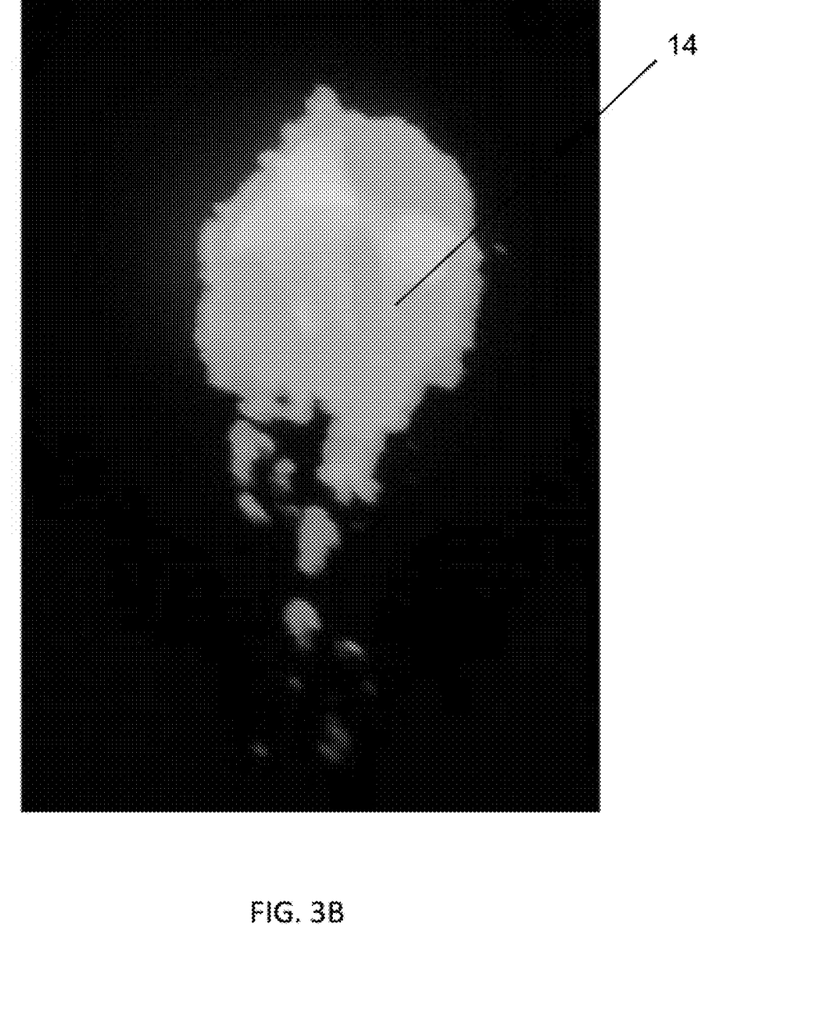
FIG. 3B is a picture of the light output of a wax marking system described in Example 4, spread onto a piece of steel plate that was conditioned in the freezer (−16° C.) overnight; shown at initial start time, with lights out.
Figure 3C:
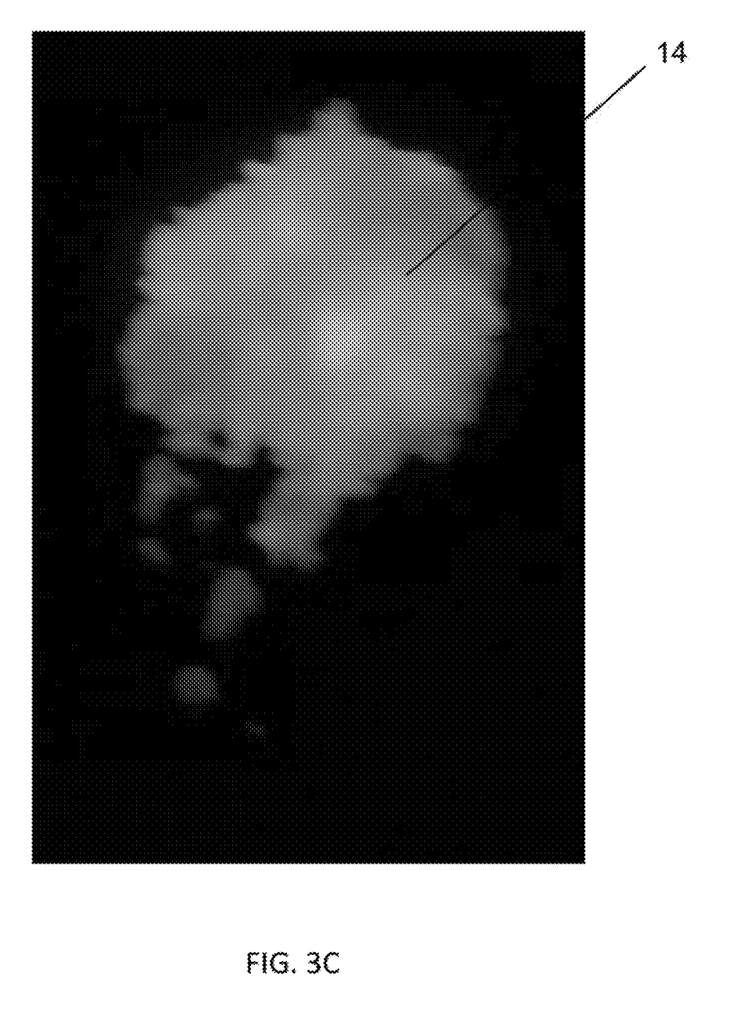
FIG. 3C is a picture of the light output of a wax marking system described in Example 4, spread onto a piece of steel plate that was conditioned in the freezer (−16° C.) overnight; shown at hour 1.
Figure 3D:
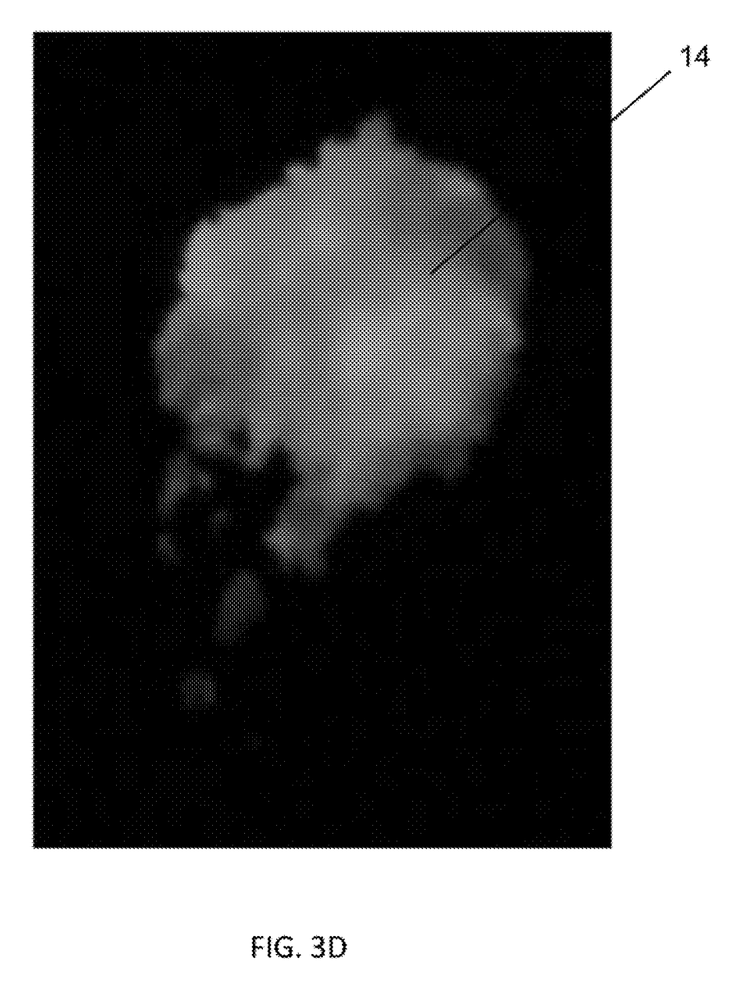
FIG. 3D is a picture of the light output of a wax marking system described in Example 4, spread onto a piece of steel plate that was conditioned in the freezer (−16° C.) overnight; shown at hour 2.
Figure 3E:
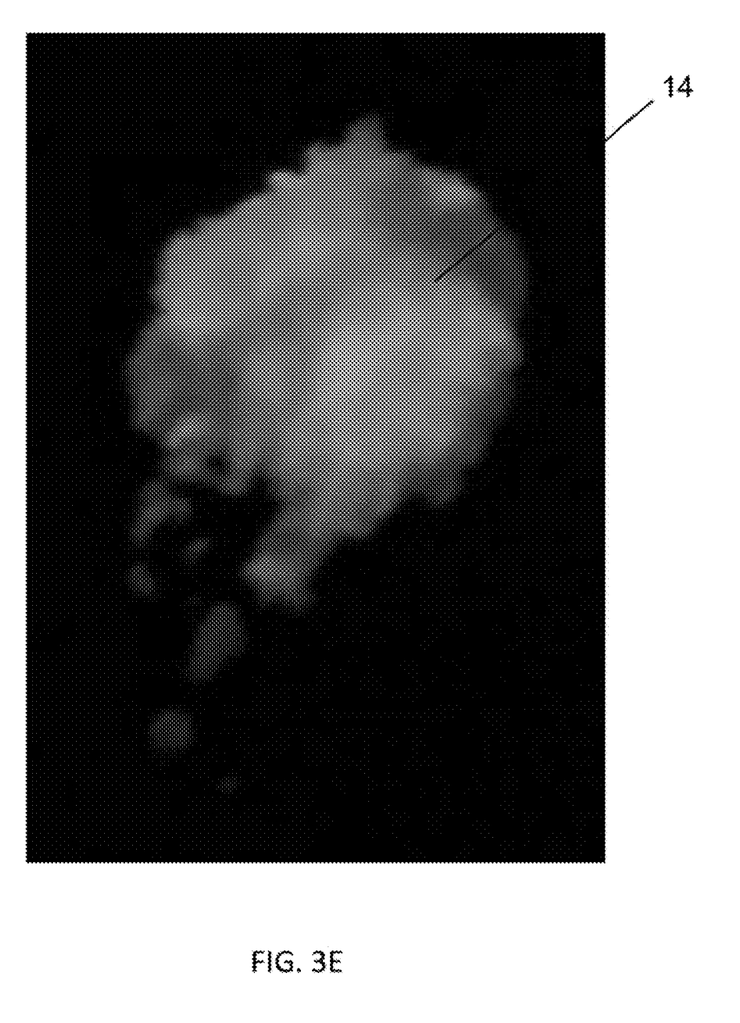
FIG. 3E is a picture of the light output of a wax marking system described in Example 4, spread onto a piece of steel plate that was conditioned in the freezer (−16° C.) overnight; shown at hour 3.
Figure 3F:
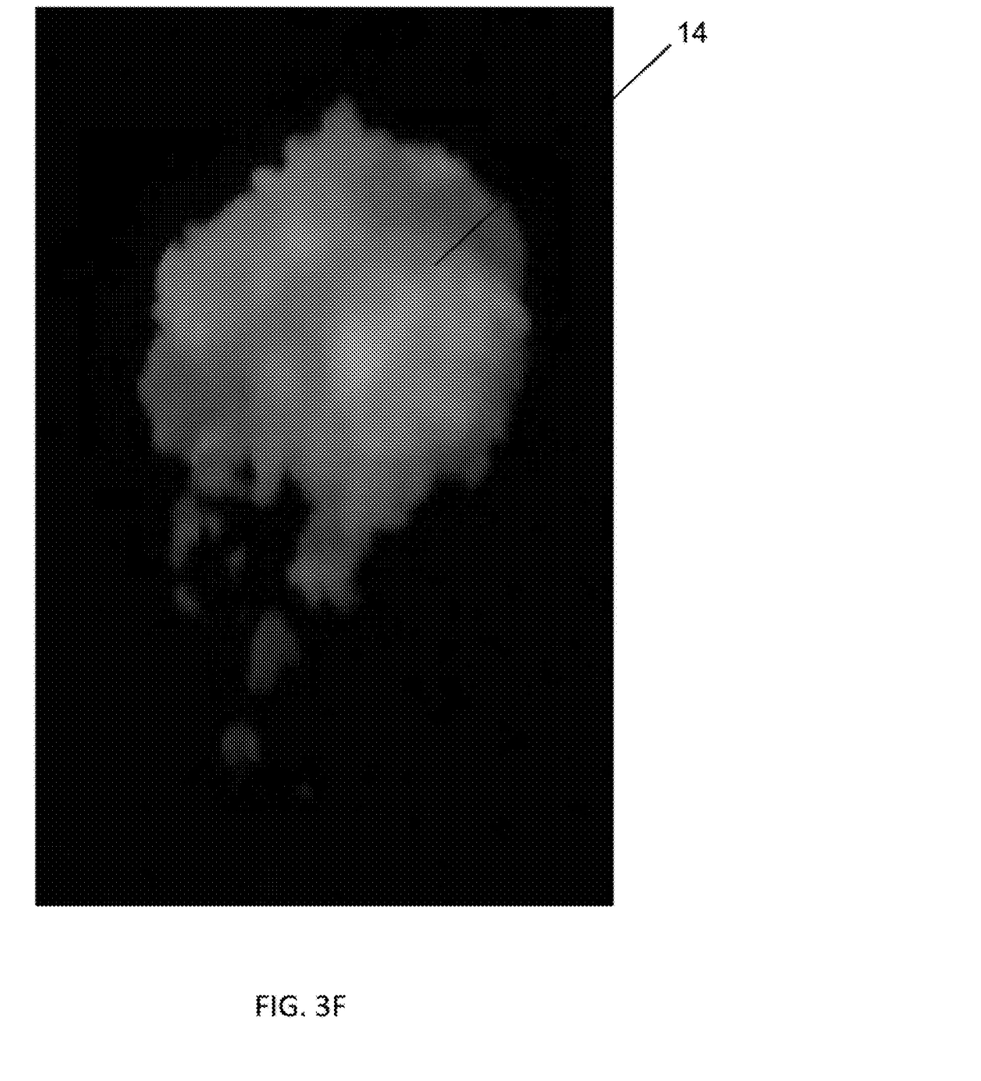
FIG. 3F is a picture of the light output of a wax marking system described in Example 4, spread onto a piece of steel plate that was conditioned in the freezer (−16° C.) overnight; shown at hour 4.
Figure 3G:
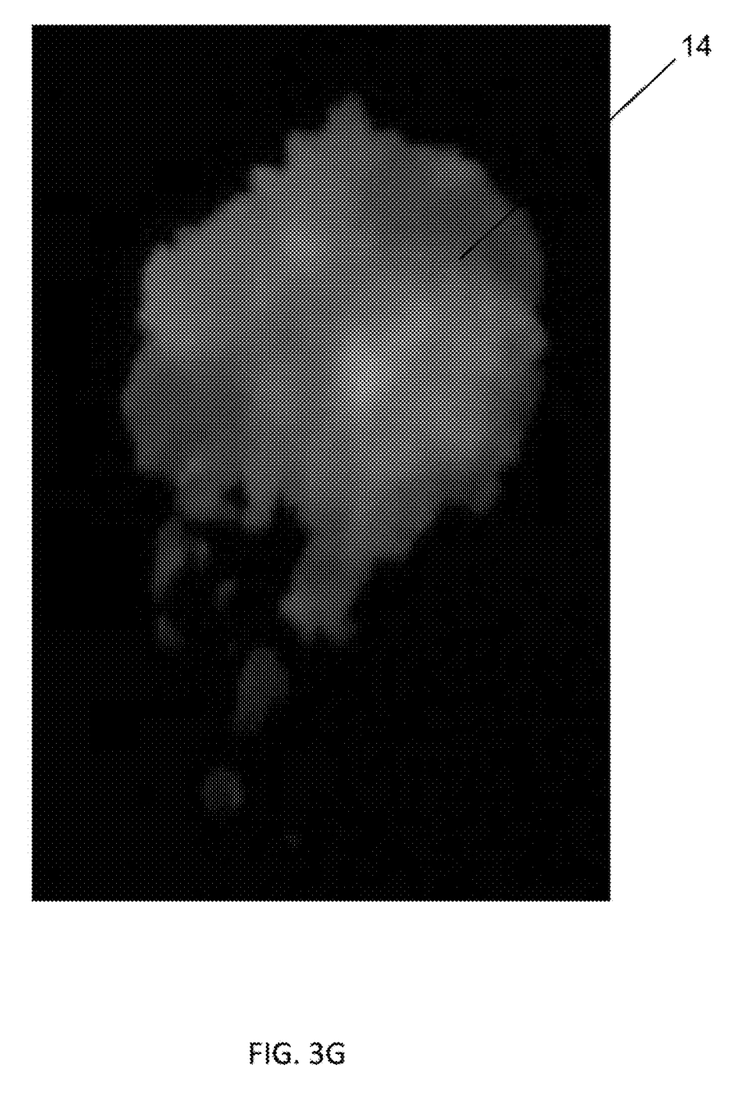
FIG. 3G is a picture of the light output of a wax marking system described in Example 4, spread onto a piece of steel plate that was conditioned in the freezer (−16° C.) overnight; shown at hour 5.

An experiment to demonstrate the water resistance of these formulations was carried out at the same time. The container used to mix these waxes was filled half-way with water and observed in a dark room while the light output experiment was being conducted, see FIG. 2, data table 12. During the time of the experiment, the wax submerged under water continued to glow with a similar intensity to the wax above the waterline. As a result, it is not expected that reasonable moisture would drastically affect the performance of the formulation in conditions outside of the laboratory.

Example 4: Wax Marking System

A two-part chemiluminescent wax marking system comprising a wax oxalate mixture comprised of 15% microcrystalline wax, 20% didodecyl succinate, 29.6% butyl benzoate, 20% LDPE Wax, 29.5% butyl benzoate, 0.4% 2-methyl-9,10-bis(2-phenylethynyl)anthracene, 0.1% of a hydrophobic fumed silica, 5% sodium thiosulfate, and 10% CBzPO and a wax activator system comprised of 32.5% glycerol tribenzoate, 39% triethyl citrate, 13.3% microcrystalline wax, 2.5% of hydrophobic fumed silica, 2.5% of a hydrophilic fumed silica, 10% of 50% aqueous hydrogen peroxide, and 0.2% sodium salicylate was made.

A sample mixture (14, see FIGS. 3A-3G) of 1 g of wax oxalate mixture and 1 g of wax activator mixture were combined as described in previous examples. Half of this was spread onto a piece of steel plate 16 that was conditioned in the freezer (−16° C.) overnight and the second half on a piece of plywood (not illustrated) similarly treated. To document their performance, pictures were taken at the beginning and then at one-hour intervals for 5 hours, see FIGS. 3A-3G. Immediately after each picture was taken, the wood and steel were placed back into the freezer. Good light was produced during the 5 hours the material was tested. FIGS. 3A-3G show test results for metal. The test results for wood were similar.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A moisture resistant, broad temperature chemiluminescent marking system comprising:
   a first chemiluminescent reactant component comprising at least one neat oxalate ester comprising bis{3,4,6-trichloro-2-[(phenylmethoxy)carbonyl]phenyl} oxalate or bis{3,4,6-trichloro-2-[(cyclohexylmethoxy)carbonyl]phenyl} oxalate, wherein said bis{3,4,6-trichloro-2-[(phenylmethoxy)carbonyl]phenyl} oxalate or said bis{3,4,6-trichloro-2-[(cyclohexylmethoxy)carbonyl]phenyl} oxalate is prilled, and at least one fluorescer; and
   a second chemiluminescent reactant component comprising at least one peroxide and at least one catalyst;
   wherein contact between said first chemiluminescent reactant component and said second chemiluminescent reactant component generates chemiluminescent light.

2. The moisture resistant, broad temperature chemiluminescent marking system according to claim 1, wherein one or more components of said first chemiluminescent reactant component are in an encapsulated form.

3. The moisture resistant, broad temperature chemiluminescent marking system according to claim 1, wherein one or more components of said second chemiluminescent reactant component are in an encapsulated form.

4. The moisture resistant, broad temperature chemiluminescent marking system according to claim 1, wherein said first chemiluminescent reactant component further comprises at least one salt which generates heat in combination with said at least one peroxide.

5. The moisture resistant, broad temperature chemiluminescent marking system according to claim 4, wherein said at least one salt which generates heat in combination with said at least one peroxide includes sodium thiosulfate, potassium thiosulfate, cobalt acetate, copper acetate, lead acetate, cupric chloride, ferric chloride, calcium iodide, potassium iodide, silver nitrate, or a combination thereof.

6. The moisture resistant, broad temperature chemiluminescent marking system according to claim 1, wherein said first chemiluminescent reactant component, said second chemiluminescent reactant component, or combinations thereof, include one or more rheology adjusting reagents.

7. The moisture resistant, broad temperature chemiluminescent marking system according to claim 6, wherein said one or more rheology adjusting reagents includes, one or more resins, one or more fumed silicas, one or more of low-melting fatty acid esters, one or more of glyceryl triesters, polyethylene waxes, or one or more paraffins.

8. The moisture resistant, broad temperature chemiluminescent marking system according to claim 1, wherein said at least one peroxide is hydrogen peroxide, sodium peroxide, sodium perborate, sodium pyrophosphate peroxide, urea peroxide; histidine peroxide, t-butyl-hydroperoxide, peroxybenzoic acid, sodium percarbonate, or mixtures thereof.

9. The moisture resistant, broad temperature chemiluminescent marking system according to claim 1, wherein said first chemiluminescent reactant component or said second chemiluminescent reactant component are stored in a delivery vehicle.

10. A moisture resistant, broad temperature chemiluminescent marking system comprising:
   a first chemiluminescent reactant component comprising at least one neat oxalate ester comprising bis{3,4,6-trichloro-2-[(phenylmethoxy)carbonyl]phenyl} oxalate or bis{3,4,6-trichloro-2-[(cyclohexylmethoxy)carbonyl]phenyl} oxalate, wherein said bis{3,4,6-trichloro-2-[(phenylmethoxy)carbonyl]phenyl} oxalate or said bis{3,4,6-trichloro-2-[(cyclohexylmethoxy)carbonyl]phenyl} oxalate is spray dried particles, and at least one fluorescer; and
   a second chemiluminescent reactant component comprising at least one peroxide and at least one catalyst;
   wherein contact between said first chemiluminescent reactant component and said second chemiluminescent reactant component generates chemiluminescent light.

11. The moisture resistant, broad temperature chemiluminescent marking system according to claim 10, wherein one or more components of said first chemiluminescent reactant component are in an encapsulated form.

12. The moisture resistant, broad temperature chemiluminescent marking system according to claim 10, wherein one or more components of said second chemiluminescent reactant component are in an encapsulated form.

13. The moisture resistant, broad temperature chemiluminescent marking system according to claim 10, wherein said first chemiluminescent reactant component further comprises at least one salt which generates heat in combination with said at least one peroxide.

14. The moisture resistant, broad temperature chemiluminescent marking system according to claim 10, wherein said at least one salt includes sodium thiosulfate, potassium thiosulfate, cobalt acetate, copper acetate, lead acetate, cupric chloride, ferric chloride, calcium iodide, potassium iodide, silver nitrate, or a combination thereof.

15. The moisture resistant, broad temperature chemiluminescent marking system according to claim 10, wherein said first chemiluminescent reactant component, said second chemiluminescent reactant component, or combinations thereof, include one or more rheology adjusting reagents.

16. The moisture resistant, broad temperature chemiluminescent marking system according to claim 15, wherein said one or more rheology adjusting reagents includes, one or more resins, one or more fumed silicas, one or more of low-melting fatty acid esters, one or more of glyceryl triesters, polyethylene waxes, or one or more paraffins.

17. The moisture resistant, broad temperature chemiluminescent marking system according to claim 10, wherein said at least one peroxide is hydrogen peroxide, sodium peroxide, sodium perborate, sodium pyrophosphate peroxide, urea peroxide; histidine peroxide, t-butyl-hydroperoxide, peroxybenzoic acid, sodium percarbonate, or mixtures thereof.

18. The moisture resistant, broad temperature chemiluminescent marking system according to claim 10, wherein said first chemiluminescent reactant component or said second chemiluminescent reactant component are stored in a delivery vehicle.

\* \* \* \* \*